Jan. 12, 1937.    G. NICHOLS    2,067,458
RUBBER MIXING MILL
Filed July 13, 1934    3 Sheets-Sheet 2
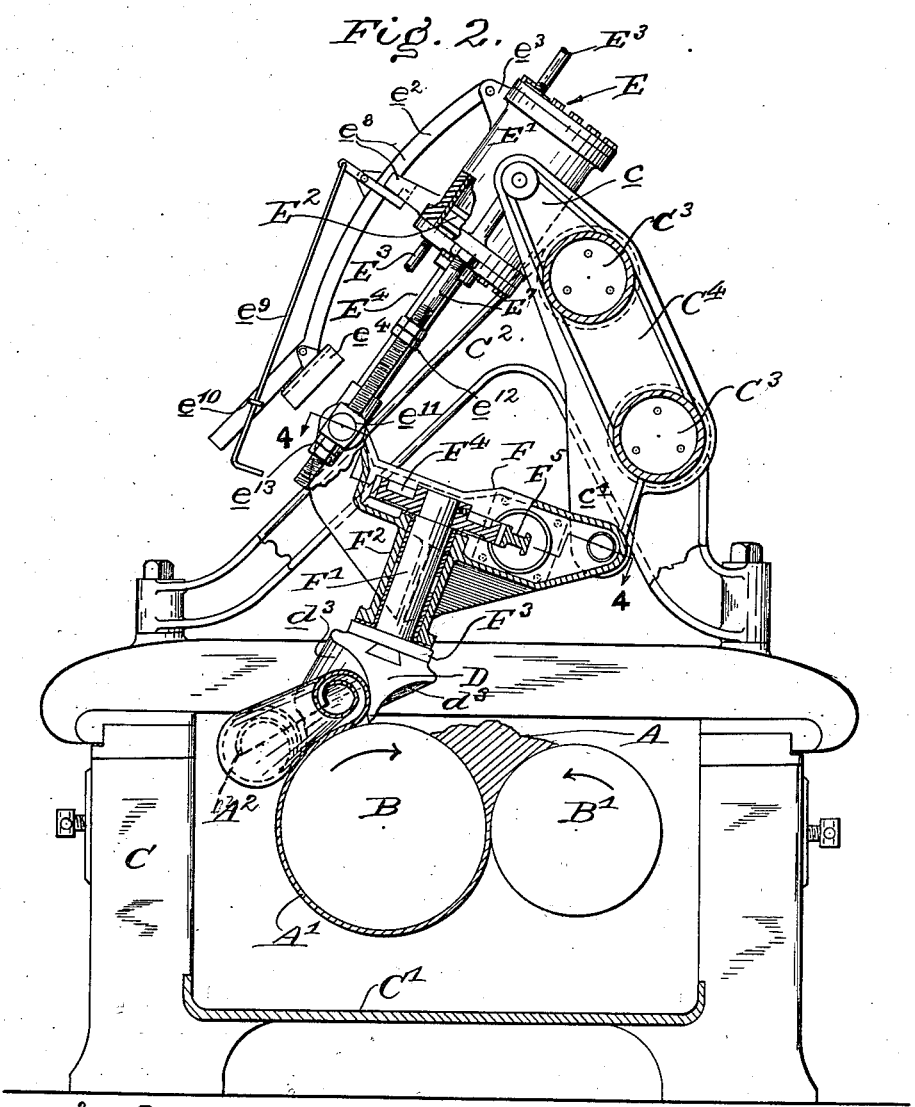
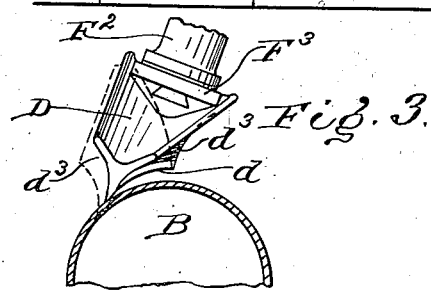
INVENTOR
George Nichols
BY
Morrison, Kennedy & Campbell
ATTORNEYS Jan. 12, 1937.  G. NICHOLS  2,067,458
RUBBER MIXING MILL
Filed July 13, 1934  3 Sheets-Sheet 3
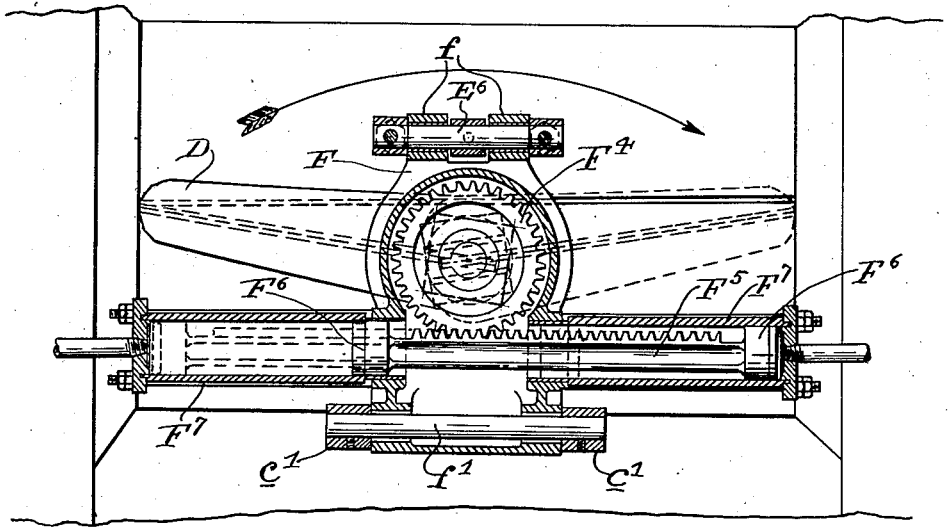
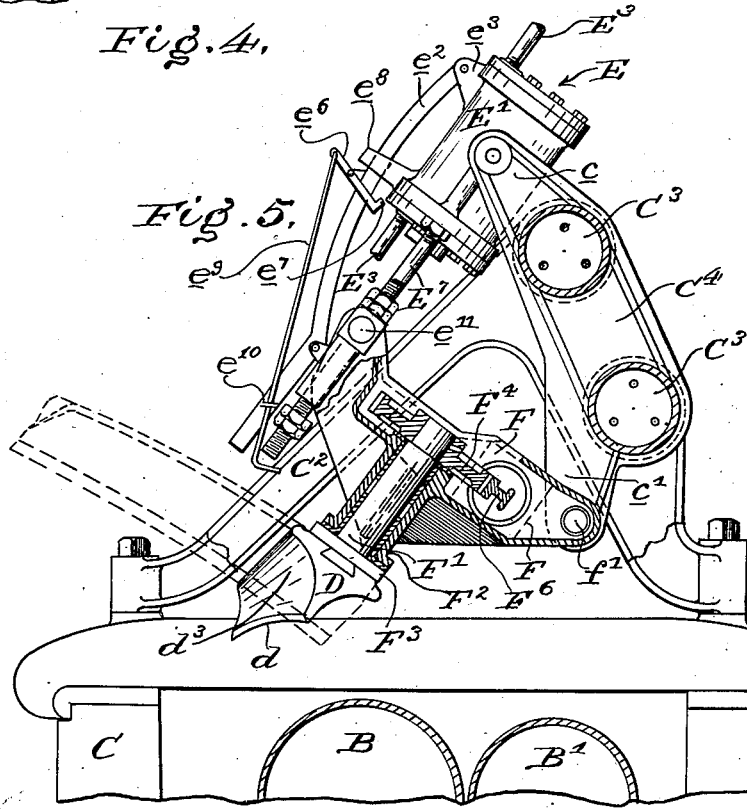
INVENTOR
George Nichols
BY
Morrison, Kennedy & Campbell
ATTORNEYS Patented Jan. 12, 1937

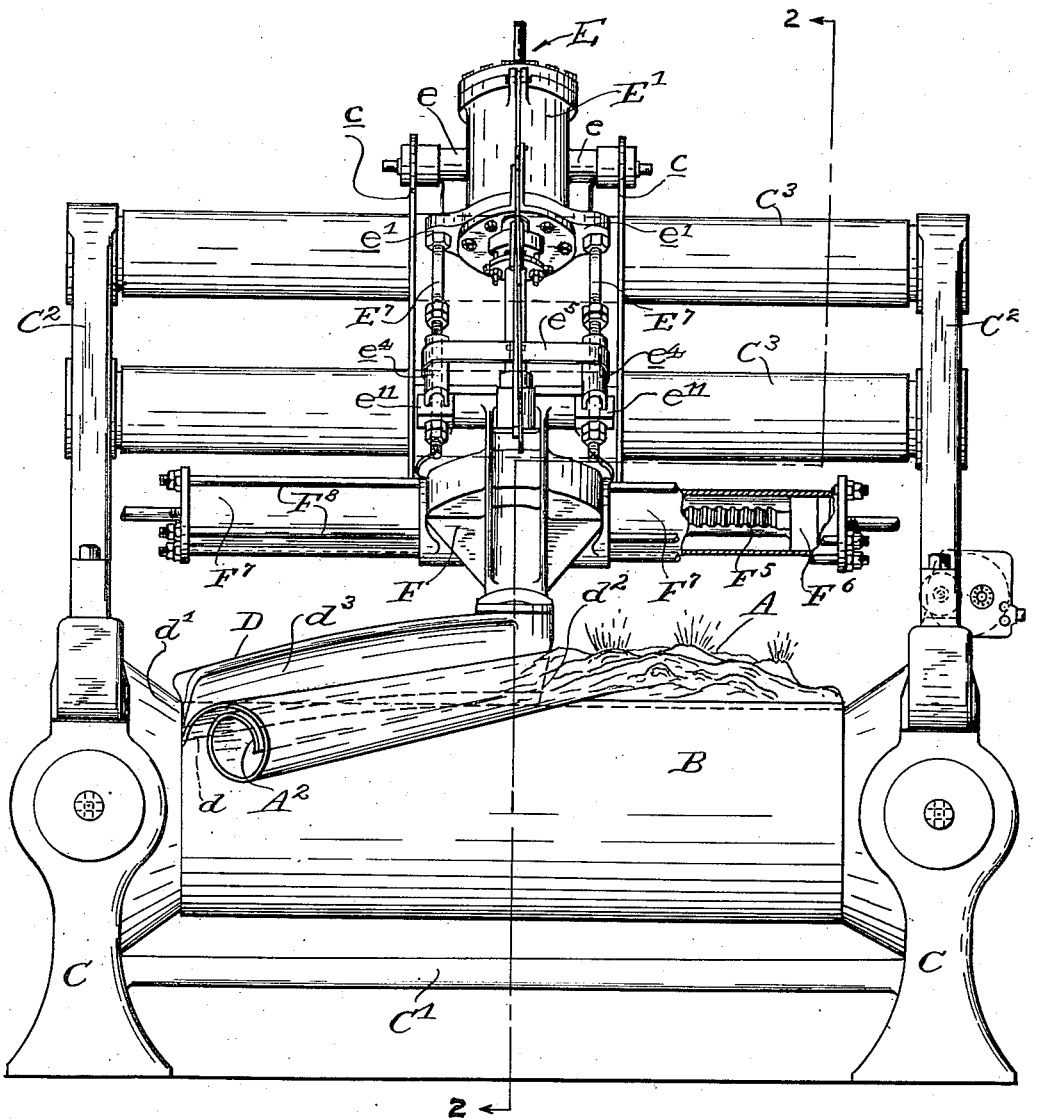

2,067,458

UNITED STATES PATENT OFFICE 2,067,458

RUBBER MIXING MILL

George Nichols, Akron, Ohio, assignor to National Rubber Machinery Company, a corporation of Ohio Application July 13, 1934, Serial No. 734,918

21 Claims. (Cl. 18—2)

This invention relates to machines for mixing plastic materials, such as compounded rubber, wherein the material being processed is passed repeatedly between a pair of spaced rolls until, upon acquiring a certain degree of plasticity, it adheres to and forms itself upon one of the rolls, whereupon the operator removes it manually and feeds it again between the rolls to allow the mixing operation to proceed. The present improvements are in the form of an attachment for a machine of this character which has for its purpose automatically removing the material adhering to the roll and returning such material between the rolls for further processing, thus obviating the manual operations heretofore found necessary.

In the process of mixing rubber compounds (in which connection the present invention will be described), crude rubber is fed into the mill where it is caught in the bite between the front and rear rolls and masticated by the squeeze of the rolls as it passes between them. After a few passes, the rubber becomes sufficiently tacky or plastic to adhere to and form itself upon the front roll in a layer having a thickness determined by the spacing of the rolls, which, in practice, is about ⅜″, although this dimension is by no means critical. After the roll is entirely coated, there still is an excess of rubber which accumulates in the bite of the rolls and is referred to as the "bank". In order completely to masticate the rubber and mix the ingredients compounded therewith throughout the mass, the operator cuts the layer of rubber with a knife, rolls it upon itself partially to bare the roll and then permits the rubber to be drawn back again into the bank; these operations being repeated over and over again until the batch is of the desired plasticity and as homogeneous as it is possible to make it under the circumstances.

The process, however, is slow, requires the utmost care on the part of the operator, and does not always result in a batch that is thoroughly homogeneous throughout. For example, the sulphur sometimes is not added until after the other ingredients have been mixing for some time in order to prevent premature vulcanization brought about as a result of the heat generated during milling. The brief period that the sulphur is present during mixing coupled with the fact that it forms a very small percentage of the entire batch, renders uniform dispersion throughout the mass extremely difficult, if not impossible.

The general objects of the present invention are to obviate such mixing difficulties, to retard the generation of heat during mixing, and to reduce the cost of mixing itself. These objects are accomplished, specifically by the provision of mechanism comprising a double-faced, plow-shaped scraping blade adapted, when in one of its active positions, to scrape the rubber from one end of the roll to which it adheres, and, when in another active position, to scrape the rubber from the opposite end of said roll, the blade engaging the roll along a line of contact oblique to the straight line elements of the roll and terminating at its trailing end adjacent the middle of the roll and at its leading end adjacent one end of the roll or the other, depending, of course, upon which of its active positions it happens to be in at the time. The arrangement is such that the rubber in effect is plowed or scraped from the roll, caused to be rolled upon itself in a series of loose convolutions and returned to the bank beyond the trailing end of the scraper or over the end of the roll opposite that with which the scraper is in contact. As a result, the rubber leaves the bank at one end and returns thereto at the opposite end, and, by alternately scraping first one end of the roll and then the other, the speed of mixing is increased and the ingredients added, more thoroughly dispersed throughout the batch.

Referring to the drawings:

Fig. 1 is a front elevational view of a mixing machine embodying the attachment which comprises the present invention;

Fig. 2 is a vertical section taken on line 2—2 of Fig. 1;

Fig. 3 is a detail view of the portion of the machine shown in Fig. 1, illustrating the details of the scraping device;

Fig. 4 is a longitudinal section on line 4—4 of Fig. 2, showing the mechanism for swinging the scraping device from one end of the roll to the other; and Fig. 5 is an end view of a portion of the machine, partly in section, showing the scraping device in its raised or inoperative position.

The batch of rubber A to be mixed is deposited between a pair of parallel rolls B, B¹ supported at their ends in bearings (not shown) mounted in upright end stanchions C forming part of the framework of the machine and so geared as to drive in opposite directions to draw the rubber from the bank down between them. Below the rolls, B, B¹, there is provided a tray C¹ which receives such rubber as is deposited during the early stages of mixing, so that it can be readily picked up and returned to the batch by the operator. After the rubber has made a few passes between the rolls, it acquires sufficient plasticity to form itself upon one of the rolls in a layer $A^1$ having a thickness determined by the spacing between the rolls B, $B^1$, as shown in Fig. 2. The peripheral speed of the rolls is regulated in such manner that the layer $A^1$ is formed upon the front roll B in order to facilitate working by the operator. Obviously, if the layer of rubber were not removed from the roll, it would continue to adhere thereto and pass continuously between the rolls, the excess, or bank A, remaining at the top with little or no mixing.

The machine as so far described is old and, in the usual practice of mixing rubber, the layer $A^1$ is removed from the roll by the operator who cuts through the layer and rolls it up manually off the roll until a sufficient amount has been removed, whereupon he permits the removed portion again to be drawn back into the bank between the rolls for further mixing and processing. When this operation is carried out manually, the rubber is returned to the bank substantially at the same position longitudinally of the rolls as it leaves the bank, so that there is very little tendency for the rubber at one end of the bank to mix or combine with the rubber at the opposite end thereof; consequently, the mixing is not as thorough as desired, although, in the past, fairly good results have been obtained by keeping the batch in the machine a considerable period of time.

In accordance with the present invention, the material is scraped from the roll and returned to the bank automatically, by a scraper blade D having its active edge $d$ contacting with the roll B on a line oblique to the straight line elements thereof, the blade, at its forward or leading end $d^1$, coinciding with or extending beyond the end of the roll, and at its rear or trailing end $d^2$ terminating somewhat beyond the middle or center line of the roll. The lateral faces $d^3$ of the scraper are curved or concaved outwardly from the active edge $d$ which contacts with the roll, somewhat in the nature of a plow. Preferably, the edge $d$ of the scraper blade is formed of Monel metal, to reduce wear from contact with the surface of the roll to a minimum.

The scraper blade D has two active positions, one at each end of the roll B, and is swung from one position to the other at suitable time intervals by means hereinafter described. When the blade D is in contact with the left end of the roll (see Fig. 1), the coating of rubber at that end is caused to roll up in a series of loose convolutions $A^2$, and the rubber which is removed is drawn again into the bank endwise of the convolutions and around the rear or trailing end $d^2$ of the scraper by the rubber remaining in contact with the roll at the right end thereof.

When the scraper D has been in contact with the roll B at one end for the proper length of time, it is raised to inactive position (see Fig. 5) and swung through an arc to a corresponding position at the opposite end of the roll, whereupon it is again lowered to perform its scraping function at the opposite end of the roll, such operations being timed by suitable mechanisms and repeated until the batch is completely mixed.

The scraping function is performed at the right end of the roll in the same manner that it was performed at the left, except that the opposite concaved surface of the scraper blade D is now active and the material stripped from the right end of the roll directed endwise of the convolutions into which it is formed back into the bank at the left end of the mill.

As a result of the foregoing operations, the material is constantly passed back and forth from one end of the bank to the other, and as the periods during which the scraper blade D contacts with the roll at the different ends are controlled automatically, its is apparent that the mixing is very thorough indeed.

The scraper is lowered and raised into and out of active position by hydraulic mechanism E, and a rocking support member F upon which the scraper D is mounted, the mechanism E and member F being supported by a superstructure mounted on the framework of the mill proper. The superstructure includes a pair of bridge members $C^2$; each bolted at the front and back to one of the end roll supporting members C of the mill and connected together by a pair of spaced hollow bars $C^3$ extending lengthwise above the mill rolls and between the bridge members $C^2$.

The hydraulic mechanism (see Figs. 1, 2 and 5) includes in part a cylinder $E^1$, provided with a pair of oppositely extending hubs $e$, journaled in a pair of upwardly extending portions $c$ of a bracket $C^4$ mounted on the hollow cross bars $C^3$, a reciprocating piston $E^2$ within the cylinder, connections $E^3$ at each end of the cylinder for the entering and leaving fluid, and a piston rod $E^4$ passing through the lower cylinder head $E^5$ and fastened at its upper end to the piston $E^2$. At the lower end of the piston rod $E^4$, there is secured a cross rod $E^6$, guided in its reciprocating movements under the influence of the piston, by a pair of guide rods $E^7$ extending through the rod $E^6$ at its opposite ends, and secured at their upper ends in a pair of opposed lugs $e^1$ formed integrally with the lower cylinder head $E^5$.

Pivotally connected to the cross rod $E^6$, is the rocker support F carrying the scraper blade, and which for this purpose is provided at the front with a pair of spaced bearings $f$ encircling the rod $E^6$ and straddling the piston rod $E^4$. The rocker support F is pivotally mounted at the rear on a shaft $f^1$ (see Fig. 4) carried by a pair of arms $c^1$ depending from the bracket $C^4$.

The arrangement is such that, as the fluid enters the cylinder $E^1$ below the piston $E^2$, the rocker support F will swing upwardly to raise the scraper to its inactive position (Fig. 5), whereas, when the fluid enters the cylinder $E^1$ above the piston $E^2$, the rocker support will swing downwardly to bring the scraper to active position in contact with the roll B. The pivotal mounting of the cylinder $E^1$ is necessary, of course, since, as the rocker support F swings between its upper and lower positions, the front end thereof will follow the path of an arc and thus cause the cylinder $E^1$ likewise to swing by virtue of the connection between the two.

The scraper blade is swung from one end of the roll B to the other when in its raised position, and for this purpose is carried by a stub shaft $F^1$ journaled in a sleeve $F^2$ extending downwardly from the rocker support F and provided at its lower end with a square flange $F^3$ which is tongued and grooved to the scraper blade at its inner or trailing end. At the upper end of the stub shaft $F^1$ there is fastened a pinion $F^4$ meshing with a rack $F^5$ supported at its ends by a pair of pistons $F^6$ operating in a corresponding pair of opposed horizontally arranged cylinders $F^7$ (see Fig. 4) carried by the rocker support member F and rigidly held in position by a series of tie rods $F^8$ suitably arranged around the cylinders and anchored at their opposite ends in the cylinder heads and the housing provided for the pinion and rack mechanism.

The pistons $F^6$ are preferably hydraulically operated (as in the case of the main operating cylinder $E^1$) and at definite time intervals (when the scraper is in its raised position), operating fluid is pumped into the proper cylinder $F^7$ to swing the scraper blade D from one of its active positions to the other, the fluid in the other cylinder, of course, being allowed to flow back to the storage reservoir.

The rack and pinion mechanism is so arranged that, as the scraper blade D is swung from one end of the roll B to the other, it passes somewhat beyond its normal position with the result that, as the scraper blade is lowered into engagement with the roll B, the forward or leading end $d^1$ thereof will make contact with the roll B prior to the rear or trailing end $d^2$. The main operating mechanism E, having more power than the mechanism which swings the scraper blade, will cause the latter to assume its normal position, wherein its active edge $d$ contacts with the roll B throughout its entire length, but in doing so, the edge $d$ cuts into the rubber coating progressively along its length, rather than along the entire length of the blade edge at once, thus requiring a minimum amount of force. The saving in power is considerable, as the rubber coating is very tough indeed.

To prevent damage to the parts in the event the pressure line to the cylinder $E^1$ fails when the scraper D is in its uppermost position, there is provided a safety mechanism which includes a lever $e^2$ pivoted at its upper end to lug means $e^3$ formed on the cylinder $E^1$ and carrying near its lower end, a pair of spaced shoes $e^4$ formed with U-shaped recesses adapted to fit around the guide rods $E^7$ and connected to the lever $e^2$ by a cross strap $e^5$ provided at its midpoint with lug means pivotally joined to said lever. Normally the shoes $e^4$ are held out of engagement with the guide rods $E^7$ by a trip bar $e^6$ pivotally mounted on the lever $e^2$ and provided with an upwardly extending finger $e^7$ adapted to engage at the base of a bifurcated lug $e^8$ formed on the cylinder and serving as a guide for the lever $e^2$ in its movements from active to inactive position. However, when it is desired to bring the safety mechanism into action, the bar $e^6$ is tripped by lifting up on a rod $e^9$ connected at its upper end to said bar and slidably held adjacent the lever $e^2$ near its lower end by an eye $e^{10}$, such action resulting in lowering the lever $e^2$ and allowing the shoes $e^4$ to rest upon the guide rods $E^7$ and engage beneath a pair of flat sided sleeves $e^{11}$ mounted at the opposite ends of the cross rod $E^6$ to which the rocker support F is pivoted and which will be in their uppermost position at the time, as shown in Fig. 5. The flat sided sleeves $e^{11}$ further serve to determine the upper and lowermost position of the scraper blade, since, when the latter is in its raised position, as shown in Fig. 5, said sleeves bank against an upper pair of lock nuts $e^{12}$ threaded on the guide rods $E^7$ and, when in its lowermost position, against a corresponding pair of lock nuts $e^{13}$ likewise threaded to the guide rods adjacent the lower ends thereof. The lock nuts $e^{12}$ and $e^{13}$ are adjustable, within limit to vary the stroke of the piston $E^2$.

As mentioned heretofore, it is the present standard practice for the workman to cut into the rubber coating and roll it up upon itself preliminarily to allowing it to go back into the bite of the rolls for further kneading and mixing. In doing so, he necessarily must roll the sheet tightly upon itself, and consequently exclude the air to a great extent from between the convolutions of the sheet. With the present improvements this is not the case, as the convolutions are loosely formed, and entrap a considerable amount of air which tends to cool the mass as it is mixed, and aids the mixing process as it escapes during the passing of the rubber compound between the rolls. Furthermore, a loose roll of rubber compound entering endwise between the rolls, as in the case with the present improvements, places a much smaller load upon the machine than would a tight roll passing sidewise throughout its length into the bite, in accordance with the present standard practice.

In its preferred form, the mechanism is hydraulically operated as described, but, if desired, electrical or steam power may be employed. Also, suitable timing mechanism (not shown) may be employed to regulate the intervals during which the scraper blade is in contact with the roll. These periods, of course, will vary in accordance with the character of the batch being processed.

In the accompanying drawings the invention has been shown merely by way of example and in preferred form, and obviously, many variations and modifications may be made therein which will still be comprised within its spirit. It is to be understood, therefore, that the invention is not limited to any specific form or embodiment, except insofar as such limitations are specified in the appended claims.

Having thus described my invention, what I claim is:

1. A machine for treating plastic material including, in combination, a pair of spaced power-driven rolls, on one of which the material from the bank forms in a layer, a scraping device associated with said roll and provided with a scraping edge arranged to contact with the surface thereof, mechanism for moving the scraping device into and out of contact with the surface of the roll, and means for causing the scraping edge of the scraping device to cut into the layer of material progressively along the length of said edge.

2. A machine for treating plastic material including, in combination, a pair of spaced power-driven rolls, on one of which the material from the bank forms in a layer, a scraping device arranged when in active position to contact with said roll along a line oblique to the straight line elements thereof, mechanism for moving the scraping device into and out of contact with the surface of the roll, and means for causing the active edge of the scraping device to cut into the layer of material progressively along the length of the scraping edge and starting at the leading end thereof.

3. A machine for treating plastic material including, in combination, a pair of spaced power-driven rolls, on one of which material from the bank forms in a layer, a scraping device arranged alternately to engage opposite ends of the roll along lines oblique to the straight line elements thereof, means for lowering and raising the scraping device into and out of engagement with the roll, and means for swinging the scraping device when in its raised position from one end of the roll to the other, said means being arranged to swing the scraping device slightly beyond its normal position so that said device, as it is lowered into engagement with the roll, cuts into the material progressively along its edge until finally said edge along its entire length contacts with the surface of the roll.

4. A machine for treating plastic material including, in combination, a pair of spaced power-driven rolls, on one of which material from the bank forms in a layer, a scraping device associated with said roll, and means for positioning the scraping device at one end of the roll oblique in one direction to the straight line elements thereof or at the other end of the roll oblique in the opposite direction to said straight line elements to remove material from the different ends of the roll.

5. A machine for treating plastic material including, in combination, a pair of spaced power-driven rolls, on one of which material from the bank forms in a layer, and a scraping device provided with concaved lateral faces associated with said roll for stripping the layer of material therefrom and adapted when active to lie in a position oblique to the straight line elements of the roll, said scraping device being movable from one position to another to render one or the other of its lateral faces active in the stripping operation.

6. A machine for treating plastic material including, in combination, a pair of spaced power-driven rolls, on one of which material from the bank forms in a layer, and a scrapping device associated with said roll and arranged obliquely to the straight line elements thereof and in contact therewith for substantially half the length of the roll at one end, said scraping device being movable to a corresponding position oblique in the opposite direction at the other end of the roll.

7. A machine for treating plastic material including, in combination, a pair of spaced power-driven rolls, on one of which material from the bank forms in a layer, and a scraping device provided with concaved lateral faces associated with said roll for stripping the layer of material therefrom and having its scraping edge adapted when in active position to contact with the roll along a line oblique to the straight line elements thereof, said scraping device being movable from one position to another to render one or the other of its lateral faces active in the stripping operation.

8. A machine for treating plastic material including, in combination, a pair of spaced power-driven rolls, on one of which material from the bank forms in a layer, a scraping device associated with said roll and having its scraping edge arranged to contact with the roll for substantially half its length and along a line oblique to the straight line elements thereof, means for raising and lowering the scraping device out of and into engagement with the surface of the roll, and means for moving the device while raised, from an oblique position at one end of the roll to an opposite oblique position at the other end of the roll.

9. A machine for treating plastic material including, in combination, a pair of spaced power-driven rolls, on one of which material from the bank forms in a layer, a scraping device provided with concaved lateral faces associated with said roll and having its scraping edge adapted when in active position to contact with the roll along a line oblique to the straight line elements thereof, means for raising and lowering the scraping device out of and into engagement with the surface of the roll, and means for moving the device while in its raised position from one end of the roll to the other whereby one or the other of said lateral faces becomes active during the stripping operation when the scraping device is in engagement with the roll.

10. A machine for treating plastic material including, in combination, a pair of spaced power-driven rolls, on one of which material from the bank forms in a layer, a scraping device associated with said roll and presentable thereto in different positions of obliquity to the straight line elements thereof to strip the material first from one portion of the roll and then from another portion thereof and arranged so as to return the material removed back to the bank, and means acting automatically to shift the scraping device into its different active positions, whereby to control the periodic engagement of the scraping device with the roll.

11. A machine for treating plastic material including, in combination, a pair of spaced power-driven rolls, on one of which material from the bank forms in a layer, a scraping device associated with said roll and presentable thereto first at one end of the roll on a line oblique to the straight line elements thereof and then in a corresponding position oblique in the opposite direction at the other end of the roll and formed so that the material stripped from the different ends of the roll is returned to the bank at the opposite ends thereof, and means acting automatically to shift the scraping device into its different active positions, whereby to control the periodic engagement of the scraping device with the roll.

12. A machine for treating plastic material including, in combination, a pair of spaced power-driven rolls, on one of which material from the bank forms in a layer, a scraping device associated with said roll and movable to different positions of obliquity with respect to the straight line elements thereof, a support for said scraping device, means for pivotally mounting the scraping device on said support whereby it may be moved to said different positions, and means for operating said support to move the scraping device into and out of engagement with the roll.

13. A machine for treating plastic material including, in combination, a pair of spaced power-driven rolls, on one of which material from the bank forms in a layer, a scraping device associated with said roll and movable to different positions of obliquity with respect to the straight line elements thereof, a support for said scraping device, means for pivotally mounting the scraping device on said support whereby it may be moved to said different positions, means for operating said support to move the scraping device into and out of engagement with the roll, and means for moving the scraping device to a plurality of different positions while out of engagement with the roll.

14. A machine for treating plastic material including, in combination, a pair of spaced power-driven rolls, on one of which material from the bank forms in a layer, a scraping device associated with said roll, means including a rocking support for said scraping device, means for pivotally mounting the scraping device on said support, means for rocking said support to move the scraping device into and out of engagement with the roll, and means for moving the scraping device to a plurality of different positions while out of engagement with the roll.

15. A combination in accordance with claim 12, wherein the means for operating the scraping blade support includes piston and cylinder mechanism operated by fluid pressure.

16. A combination in accordance with claim 13, wherein the means for moving the scraping blade to its different positions while out of engagement with the roll includes piston and cylinder mechanism carried by the support and operated by fluid pressure.

17. A scraping device for use in association with a roll and formed with a pair of concaved lateral faces converging to a scraping edge, said scraping edge being curved longitudinally to conform to a line oblique to the straight line elements of the roll with which it is adapted to be associated.

18. A combination in accordance with claim 13, wherein the means for operating the scraping blade support includes piston and cylinder mechanism operated by fluid pressure.

19. A combination in accordance with claim 14, wherein the means for operating the scraping blade support includes piston and cylinder mechanism operated by fluid pressure.

20. A combination in accordance with claim 14, wherein the means for moving the scraping blade to its different positions while out of engagement with the roll includes piston and cylinder mechanism carried by the support and operated by fluid pressure.

21. A machine for treating plastic material including, in combination, a roll and a scraping device associated with said roll, said scraping device being formed with a pair of concaved lateral faces converging to a scraping edge adapted to contact with the roll and movable so as to bring first one and then the other of said faces into action, and means for effecting such movement of the scraping device.

GEORGE NICHOLS.